United States Patent [19]
Partridge et al.

[11] Patent Number: 6,160,819
[45] Date of Patent: Dec. 12, 2000

[54] METHOD AND APPARATUS FOR MULTIPLEXING BYTES OVER PARALLEL COMMUNICATIONS LINKS USING DATA SLICES

[75] Inventors: Craig Partridge, El Cerito, Calif.; Walter C. Milliken, Dover, N.H.

[73] Assignee: GTE Internetworking Incorporated, Burlington, Mass.

[21] Appl. No.: 09/026,269

[22] Filed: Feb. 19, 1998

[51] Int. Cl.[7] .................................................. H04J 3/00
[52] U.S. Cl. ........................ 370/474; 370/535; 370/536
[58] Field of Search .................................. 370/517, 536, 370/535, 537, 542, 543, 544, 540, 474, 476

[56] References Cited

U.S. PATENT DOCUMENTS

| | | | |
|---|---|---|---|
| 5,177,742 | 1/1993 | Herzberger | 370/536 |
| 5,251,210 | 10/1993 | Mann et al. | 370/112 |
| 5,309,441 | 5/1994 | Kuroda | 370/517 |
| 5,537,405 | 7/1996 | Yoshifuji | 370/536 |
| 5,588,003 | 12/1996 | Ohba et al. | 370/536 |
| 5,680,400 | 10/1997 | York | 370/536 |
| 5,859,904 | 1/1999 | Huang | 370/536 |

OTHER PUBLICATIONS

H. Adiseshu, G. Parulkar & G. Varghese, "A Reliable and Scalable Striping Protocol," SIGCOMM '96, CA, USA, Aug. 1996.

S. Cheshire and M. Baker, "Consistent Overhead Byte Stuffing," SIGCOMM '97, Cannes, France, Sep. 1997.

J. Duncanson, "The Technology of Inverse Multiplexing," Ascend Communications, Inc., http://www.ascend.com/1130.html, Feb. 18, 1998.

Mega–T®, "Multiple T1 Inverse Multiplexer," Larscom Incorporated, http://www.larscom.com/t3ft3/t3_mt1.htm, Feb. 18, 1998.

*Primary Examiner*—Min Jung
*Attorney, Agent, or Firm*—Leonard Charles Suchyta; Floyd E. Anderson

[57] ABSTRACT

A communication technique for transmitting packet data over parallel communication sublinks coupled to a processor unit is provided. Initially, a method receives a packet of data from a first communication link which is coupled to a set of sublinks. The method distributes packets over each of the sublinks utilizing a unique byte-by-byte (BBB) striping technique. Logically, the data bytes associated with each sublink are collected into a slice of data and each set of slices are given a unique predetermined label. Each slice is then synchronously transmitted at the aggregate bandwidth of each sublink in parallel across each corresponding sublink to a receiver. A receiver receives the slices of data from the set of sublinks and aggregates the bandwidth of these two or more communication sublinks into a single communication link. Unless there are errors, a packet is transmitted in order using multiple slices. The system recreates the original packet of data from sets of slices having the same unique label. Specifically, the system uses the byte-by-byte striping technique to extract the appropriate bytes of information from each slice received over the parallel sublinks based upon a predetermined sublink sequence corresponding to the labels. This technique is advantageous in that it provides an optimal balance between preserving packet order and conserving network resources.

76 Claims, 6 Drawing Sheets

METHOD AND APPARATUS FOR MULTIPLEXING BYTES OVER PARALLEL COMMUNICATIONS LINKS USING DATA SLICES

BACKGROUND OF THE INVENTION

1. Field of the Invention

This invention generally relates to data networking technologies and more particularly, to a method and apparatus for multiplexing bytes over parallel communication links using data slices.

2. Description of the Related Art

Increasing reliability and availability of high speed networks has fueled the growth of many new telecommunication based services. The Internet is one widely known and widely used network being used to deliver electronic commerce (e-commerce), telecommuting, and interactive entertainment services around the world. Predicted growth in these commercial endeavors will continue to far out pace the availability of bandwidth current telecommunication vendors can provide.

Telecommunication systems used on the Internet and other worldwide networks typically include local area networks coupled to very high speed wide area networks or back bones. The local area networks (LAN) are installed at small campuses or businesses and typically low cost and provide bandwidth capacity from 10 Mbps to 100 Mbps.

In contrast, WAN (wide area networks) generally cost more to implement and provide higher bandwidth capacities. WANs generally operate at much wider range of bandwidth capacities ranging from tens of kilobits to gigabits per second. Future networks will likely operate in the terabit range or higher. Further, WANs must transport variable size packets generated by different networks having different bandwidth characteristics. These packets frequently travel distances spanning numerous continents. Consequently, the right-of-ways for land based connections and frequency licenses used in wireless connections can make WANs costly to implement.

Synchronous digital hierarchy (SDH) is a protocol established to carry the needs of many different types of communication systems including voice, data, and video. Three different versions of SDH exist: SDH-Europe, SDH-Japan, and SONET for North America. Except for some minor differences between these three versions, these systems are essentially compatible. Collectively, SDH will be referred to as SONET.

SONET is designed to accommodate a wide mixture of protocols and bandwidths such as T-1, T-3, E-1 and other high speed protocols. Network systems implementing SONET are capable of stripping bandwidth off at geographically distant locations with little difficulty. Unlike other WAN protocols, the SONET design allows high speed data to be stripped off at distant locations without demultiplexing and reagreggating bandwidth at each drop point. Instead of conventional multiplexers, the SONET system uses add-drop multiplexers (ADM) to distribute high speed data at various geographic locations. For at least these reasons, SONET is especially desirable in video systems, interactive gaming, e-commerce, and other high bandwidth low-latency applications spread over large geographic areas.

High speed SONET currently available operates at rates up to) approximately 10-Gbps per second and is otherwise known as OC-192. Essentially OC-192 is 192 times faster than OC-1 (51.85 Mbps). All SONET and SDH systems are designed to operate at multiples of 51.85 Mbps to allow for efficient conversion from one data rate to the other.

In practice OC-192 is difficult to implement over most networks. Specifically, OC-192 does not work well over older transmission mediums which may have geometric irregularities or impurities in the transmission mediums composition. For example, a phenomenon known as polarization-mode dispersion can cause a signal frequency to shift over long distances and introduce noise and distortion on an OC-192 communication link. Even with new cables having few irregularities, OC-192 may be difficult to implement without developing expensive optical transmitters operating at very high frequencies. These high speed transmitter devices for OC-192 can be extremely difficult to design and prone to failure.

Many WANs have achieved the high speed bandwidth at OC-192 and higher by aggregating multiple lower speed optical or copper channels. Numerous OC-48 channels have been successfully combined together using a technology known as wave division multiplexing or WDM.

On a fiber optic network, WDM takes advantage of the inherent high bandwidth capacity of an optical fiber by transmitting data in parallel over the optical medium. Signals co-exist on the optical medium by transmitting data with lasers having different wave lengths. Each wave length can be used to establish a separate sublink between the transmitter-receiver pair. The system receiving the WDM transmission includes optical receivers sensitive to the different wave lengths or frequencies used during the transmission. By transmitting information in parallel, overall capacity on a SONET system can be increased by the number sublinks used in the transmission. WDM has rapidly increased in popularity because it allows for high speed transmission at a lower cost and a higher degree of reliability. Further, data transmission occurs over a series of slower links, which are less expensive to create and are more robust in less than ideal communication environments.

In practice, WDM works well in applications that access the multiple sublinks in parallel. However, WDM does not work well when using network interconnect devices such as routers, switches and hubs which are better suited for use with a single sublink. These network interconnect devices typically transmit information over a single sublink between any two devices. Clearly, the challenge in using WDM with conventional network interconnect devices such as routers, switches and hubs, lies in aggregating the bandwidth from several parallel links into a single channel.

Packet-by-packet striping is one method of utilizing multiple parallel sublinks to carry data from a single communication link. Packet-by-striping distributes one packet on a first sublink and subsequent packets on subsequent sublinks. This technique evenly distributes multiple packets over multiple links and transmits the data in parallel. Unfortunately, packet-by-packet striping has limitations if one is interested in keeping the packets in order and processing them in a work conserving scheme.

In a work conserving queuing scheme, servers and networks should not be idle when packets in the queue are ready for transmission. For example, a conventional network using WDM may extract packets out of order and send the packets over a communication link which happens to be idle. This technique is work conserving but delivers packets out of order and introduces additional delay reordering packets at the receiver.

Further, packets transmitted out of order in a packet-by-packet striping scheme may require that additional sequence numbers are inserted into each packet. If the sequence number range is large, the packet sizes may be significantly enlarged to hold the sequence number values. This can contribute to increased buffer sizes and other resource utilization.

Conversely, systems which preserve packet order may not be work conserving with respect to network bandwidth. For example, conventional systems designed to preserve packet ordering may temporarily hold packets in a queue waiting for the next sequential packet to arrive. Meanwhile, buffers and other resources are underutilized waiting for the next sequential packet to arrive.

It is desirable to develop a technique for aggregating multiple high speed links into a single higher speed link for delivery to interconnect devices or other communication points. The technique should be work conserving and also deliver packets in order to reduce processing time associated with reordering packets. This will take advantage of parallel communication technologies such as WDM and facilitate their integration in networks which require a single communication link. A single high speed communication link delivered from multiple parallel sublinks provided over a WAN will enable many more systems to communicate at lower costs and higher efficiencies.

SUMMARY OF THE INVENTION

In one aspect of the present invention, a method and apparatus for transmitting packet data over two or more communication sublinks coupled to a processor unit is provided. Initially, the method receives a packet of data bytes over a first communication link which is coupled to a set of sublinks. The method distributes the bytes of data over each of the sublinks utilizing a unique byte-by-byte striping technique. The byte-by-byte (BBB) striping process distributes all the data bytes in each packet received from the first communication link evenly over the sublinks. Logically, the data bytes associated with each sublink are collected into a slice of data. Each slice is then synchronously transmitted in parallel across each corresponding sublink at the aggregate bandwidth of each sublink to a receiver which terminates the sublinks. The method individually labels each slice transmitted in parallel with a unique predetermined label to distinguish them from slices transmitted at earlier or later time intervals.

In another aspect of the present invention, a method and apparatus for receiving data from a second set of sublinks and aggregating the bandwidth of these communication sublinks into a single communication link is provided. Systems consistent with the present invention receive one or more slices of data transmitted over the sublinks. Each slice of data contains a predetermined unique label in the header portion of each slice indicating the sequence in which groups of slices are transmitted. The sequence information can be used for error detection. Generally, a packet is transmitted over multiple slices or multiple groups of slices. Unless there are errors, the system delays processing until all slices associated with the predetermined unique label are received over the sublinks. The system recreates the original packet of data from multiple slices transmitted in parallel or multiple groups of slices transmitted in parallel over several time intervals. Specifically, the system uses the byte-by-byte striping technique to extract the appropriate bytes of information from each slice received over the parallel sublinks based upon a predetermined sublink sequence. The system provides the recreated packet of data over a second communication link at a bandwidth which is at least greater than the bandwidth of any one of the sublinks. This technique is advantageous in that it preserves packet order and is always work conserving unless a slice is lost en route or sublink delays vary substantially.

BRIEF DESCRIPTION OF THE DRAWINGS

The accompanying drawings, which are incorporated in and constitute a part of this specification, illustrate an embodiment of the invention and, together with the description, serve to explain the advantages, and principles of the invention.

In the drawings.

INTRODUCTION

Reference will now be made in detail to an implementation of the present invention as illustrated in the accompanying drawings. Where ever possible, the same reference numbers will be used through out the drawings and the following description to refer to the same or like parts.

Systems consistent with the present invention address shortcomings of the prior art and provide a method and apparatus for multiplexing data over multiple parallel communication sublinks in a byte-by-byte manner. Striping data byte-by-byte over the multiple parallel communication sublinks allows the network to treat multiple parallel sublinks as one logical communication link. With this, networks can transmit variable size packets in packet order. This is advantageous because an available sublink can be used at substantially the same time interval as it becomes available. In contrast, conventional packet-by-packet striping techniques often delay a packet from being transmitted to avoid out of order transmissions.

In addition, systems consistent with the present invention are also advantageous in that they preserve packet ordering and obviate the need for reordering packets after they are received. For example, byte-by-byte striping multiplexes and demultiplexes packets over the parallel links in a predetermined sublink sequence and therefore preserves the overall order of the packets. This reduces the additional overhead associated with extracting sequencing information and reordering packets transmitted out of order.

A system designed in accordance with the present invention assumes packets are transmitted over an optical fiber or other transmission medium capable of carrying the desired bandwidth. Preferably, each node on the network is controlled by one or more synchronized clocks such as used on SONET type networks. Further, the network consists of multiple parallel links which operate at the same bandwidth or multiples of the same bandwidth such as OC-1 (51.85 Mbps). For example, a SONET system using WDM (Wave Length Division Multiplexing) can use a single optical fiber to establish multiple links. Multiple links are established over a single fiber using numerous laser devices transmitting information over different predetermined wave lengths. Each link is triggered by multiple highly accurate synchronized clocks located at various points on the network. These clocks are typically atomic based clocks or clocks synchronized via Global Positioning Satellites (GPS) well known in the art. Using closely synchronized clocks avoids clock drift which may arise as data is communicated over the large distances spanned by the network.

COMPUTER NETWORK

Figure 1:
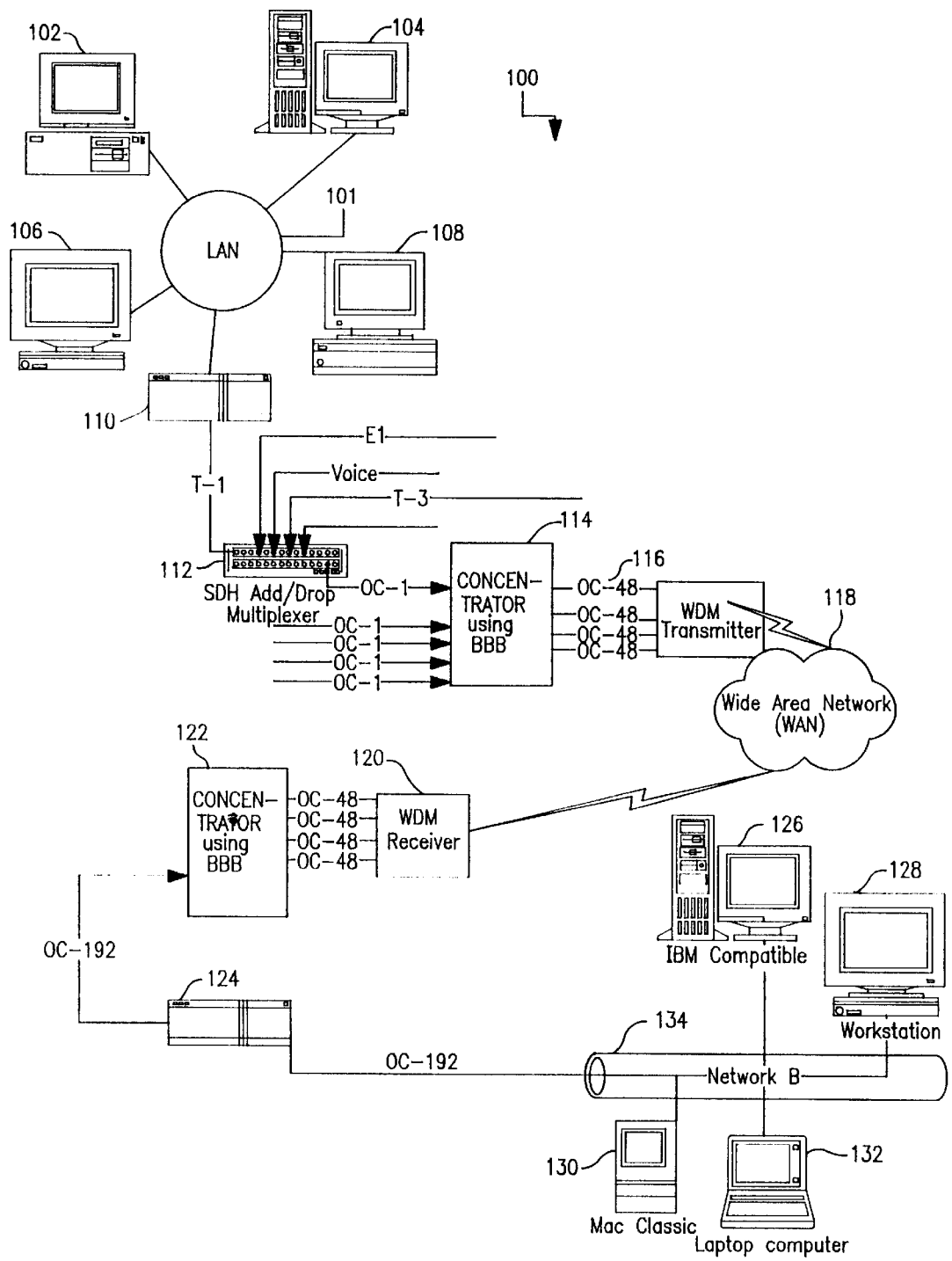
FIG. 1 illustrates a network in which one embodiment of the present invention can be implemented.

FIG. 1 illustrates a network in which one embodiment of the present invention can be implemented. The exemplary network in FIG. 1 is for descriptive purposes only and although the description may refer to terms commonly used in describing particular computer systems such as an IBM compatible computer, a work station or a Macintosh computer, the description and concepts equally apply to other computer systems, network devices, and network interconnect devices such as routers, switches and hubs.

Computer network 100 in FIG. 1 includes Local Area Network (LAN) 101, backbone or Wide Area Network (WAN) 118, and Local Area Network (LAN) 134 in its essential configuration. LAN 101 includes a series of work stations and server computers 102, 104, 106, and 108. These computer systems 102–108 are coupled to the network in order to share information, transmit data, and potentially share computational capabilities. LAN 101 is coupled to the larger overall network using a network interconnect device 110. The specific type of network interconnect device can be a router, a switch, or a hub depending on the particular network configuration. In general, network interconnect device 110 includes routers, switches, hubs or any network interconnect device capable of coupling together a LAN 101, a WAN 118, and user terminals into an integrated network. Systems designed in accordance with the present invention may be physically embedded in a network interconnect device 110 or may be embedded in a concentrator 114 and coupled externally to such a network interconnect device 110 as illustrated in FIG. 1.

In one configuration, network interconnect device 110 is coupled to an add/drop multiplexer 112 (ADM) and a first concentrator 114. Multiplexer 112 allows various network connections to be coupled into network interconnect device 110 and first concentrator 114. First concentrator 114 is capable of transmitting information at up to OC-192 or 10 Gbps per second over four OC-48 sublinks going into a WDM transmitter 116. A system designed with this high speed capability would be especially useful in video conferencing, three dimensional interactive gaming, or other high band width low latency network based applications.

Concentrator 114 utilizes byte-by-byte (BBB) striping designed in accordance with the present invention to exploit available bandwidth in the parallel communication sublinks typically used in networks using WDM and SONET. As illustrated in FIG. 1, WDM transmitter 116 receives signals over four sublinks provided by concentrator 114. In one embodiment, WDM transmitter 116 translates the electrical signals transmitted over these four links into corresponding optical signals and sends them over a fiber optic network within WAN 118. For example, first concentrator 114 receives high speed digital communication totaling an aggregate bandwidth corresponding to OC-192 or 10 Gbps per second, and utilizes BBB striping to distribute this bandwidth over 4 OC-48 links. WDM transmitter 116 converts signals transmitted over these 4 OC-48 links to optical signals suitable for transmission over back bone WAN 118.

On the receiving end of network 100 a corresponding WDM receiver 120 is coupled to the parallel sublinks provided by WAN 118. WDM receiver 120 converts transmitted input signals back into suitable electrical signals for further processing by a second concentrator 122 which also has BBB striping capability. Second concentrator 122 demultiplexes information transmitted over the parallel sublinks (OC-48) provided by WDM receiver 120. This information is processed and reassembled into a single high speed OC-192 communication link and transmitted to a high speed network interconnect device 124. In one embodiment, network interconnect device 124 is coupled directly to LAN 134. In turn, LAN 134 provides high speed communication capabilities to computer systems 126, 128, 130, and 132.

NETWORK INTERCONNECT DEVICE

Figure 2:
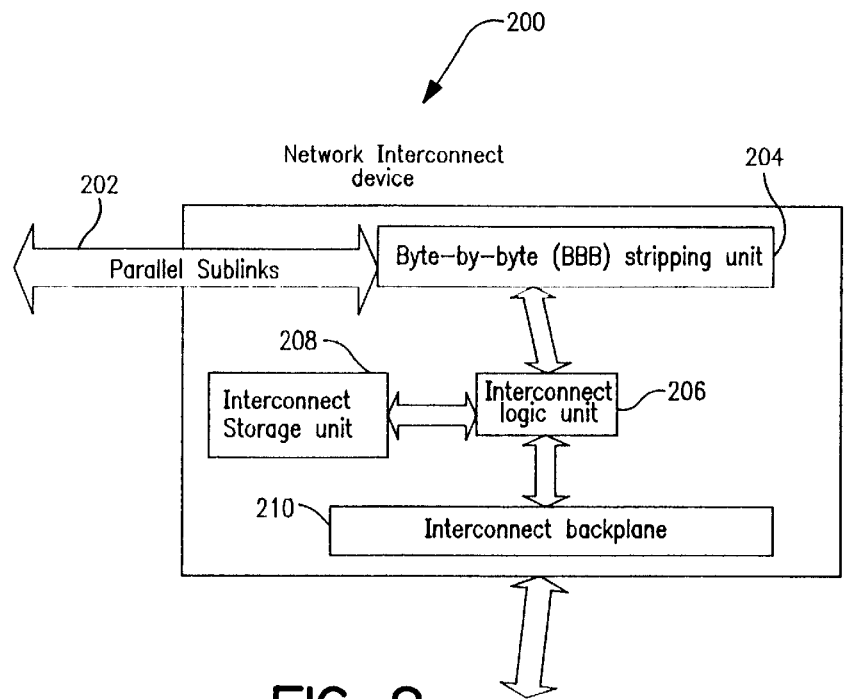
FIG. 2 is a block diagram of an exemplary network interconnect device designed in accordance with the present invention.

Referring now to FIG. 2, an exemplary network interconnect device 200 designed in accordance with the present invention is illustrated. Certain subsystems commonly associated with network interconnect device 200 have been omitted to emphasize the more germane aspects of the present invention. For example, FIG. 2 does not include router management subsystems such as the Internetwork Operating System (IOS) used in Cisco Routers to manage aspects of a router device including: router tables, router to router communication protocols, and router usage statistics. Accordingly, those skilled in the art of designing and constructing network interconnect devices should be able to integrate a system designed in accordance with the present invention with existing network interconnect devices based upon the figures and the discussion provided below.

Network interconnect device 200 in FIG. 2 includes a BBB striping unit 204 operatively coupled to parallel sublinks 202. In one embodiment, sublinks 202 each have a bandwidth of M and the aggregate bandwidth is approximately M times the number of parallel sublinks.

BBB striping unit 204 is also coupled to an interconnect logic unit 206 for further processing data provided over sublinks 202. Interconnect logic unit 206 includes circuitry and logic necessary for the corresponding type of network interconnect device being used in the network configuration. For example, interconnect logic unit 206 can include logic necessary for a router device, a switching device or an intelligent hub device. Interconnect logic unit 206 can be constructed from programmable logic devices (PLD) manufactured by companies such as Altera, Inc. or Xylinx, Inc. or application specific integrated circuit (ASIC). In one embodiment as illustrated in FIG. 2, interconnect back plane 210 is coupled directly to interconnect logic 206. However, those skilled in the art should understand that this configuration is provided for illustrative purposes only and interconnect back plane is conceivably coupled to other elements within a network interconnect device 200.

For storing information, an interconnect storage unit 208 is coupled to interconnect logic unit 206. Information related to the processing of network information or other related information may be stored in interconnect storage unit 208. Typically, interconnect storage unit 208 is constructed from random access memory (RAM), read only memory (ROM) or other types of high speed storage devices.

After processing is complete, data is provided to interconnect back plane 210 for use by computers and other devices coupled to the network. For (example, interconnect back plane 210 can be a network communication link utilizing protocols such as SONET, Ethernet, Token-Ring, High Performance Parallel Interface (HIPPI), or can be a bus technology such as Personal Computer Interface (PCI).

Figure 3:
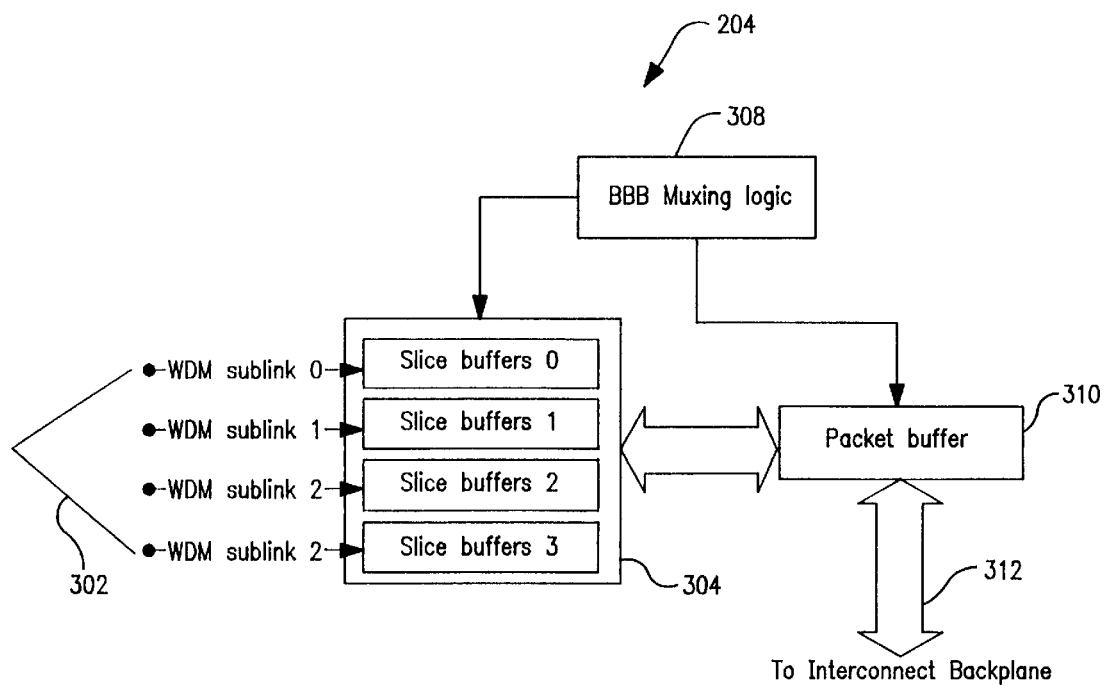
FIG. 3 is a block diagram illustrating a byte-by-byte striping unit designed in accordance with one embodiment of the present invention.

FIG. 3 includes a more detailed illustration of BBB striping unit 204 in accordance with one embodiment of the present invention. BBB striping unit 204 includes numerous elements for multiplexing and demultiplexing data over multiple parallel sublinks. A set of multiple parallel sublinks 302 are coupled to a corresponding number of slice buffers 304. FIG. 3 illustrates one embodiment including four WDM sublinks labeled WDM sublink 0, WDM sublink 1, WDM sublink 2, and WDM sublink 3. Accordingly, slice buffers 0 corresponds to WDM sublink 0, slice buffers 1 corresponds to WDM sublink 1, slice buffers 2 corresponds to WDM sublink 2, and slice buffers 3 corresponds to WDM sublink 3. Each sublink has at least OC-48 bandwidth capacity and is coupled to a separate slice buffer for receiving and sending data. Accordingly, slice buffers 304 include buffers and supporting circuitry for inbound data and outbound data transferred over parallel sublinks 302.

A byte-by-byte (BBB) muxing logic 308 is coupled to several elements of BBB striping unit 204 and serves to control the various subsystems. In one system designed in accordance with the present, BBB muxing logic 308 is coupled to slice buffers 304 and packet buffer 310.

BBB striping unit 204 operates as both a transmitter and receiver unit in a high speed data network environment.

During transmission, packet buffer 310 receives packet data from the interconnect back plane 312, as illustrated in FIG. 3. BBB muxing logic 308 selects bytes of data from packets collected in packet buffer 310 and distributes them over buffer slices 304. In one embodiment of the present invention, bytes are striped across each buffer slice in buffer slices 304 in sequential order. This distributes packets evenly over the parallel sublinks. Once each of the slices are, filled with byte information they are transmitted in parallel the sublinks. In one embodiment, muxing logic 308 coordinates the flow of information from packet buffer 310 into slice buffers 304 as well as synchronizes data over parallel sublinks. Details on the operation and logic included in byte-by-byte muxing logic 308 are discussed in further detail below.

Byte by byte striping of data packets converts variable sized packets received over interconnect backplane 312 into one or more fixed size storage elements called a slice. Transmitting fixed size slices utilizes bandwidth more efficiently and facilitates a more efficient use of network bandwidth. Further, the byte-by-byte striping method of the present invention maintains packet order and reduces overhead associated with reordering and retransmitting out-of-order data.

Figure 4:
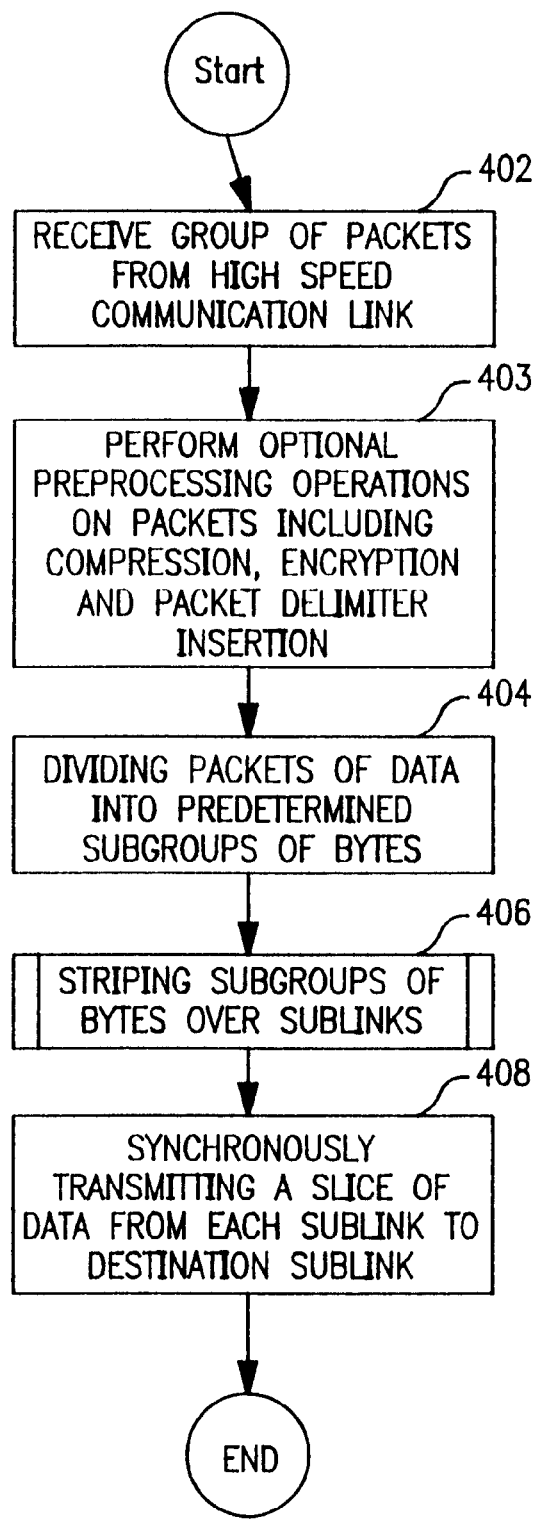
FIG. 4 is a flow chart diagram describing the overall steps associated with transmitting packet data utilizing a byte-by-byte striping technique in accordance with one embodiment of the present invention.

FIG. 4 is a flow chart diagram describing the overall steps associated with transmitting packet data utilizing a byte-by-byte striping technique in accordance with one embodiment of the present invention. Logic associated with the transmitting packet data is typically found in byte-by-byte muxing logic 308 as illustrated in FIG. 3.

The transmission method begins when a group of packets are transmitted from a communication link coupled to interconnect back plane 312 in FIG. 3 (step 402). Typically, these data bytes are transmitted utilizing point-to-point (PPP) protocol, TCP/IP protocol, an asynchronous transfer mode (ATM) protocol or any other protocol capable of handling high speed communications.

At step 403 packet delimiters, if not already present, may be inserted into the data stream to separate packets of information. Packet delimiters can be used by the receiver to determine when a complete packet of data has been received. In one embodiment, a byte stuffing technique described in "Consistent Overhead Byte Stuffing-COBS", by Stuart Cheshire and Mary Baker, SIGCOMM September 1997 is used to generate packet delimiters with a minimal amount of storage overhead. Further optional preprocessing operations performed at step 403 may include encryption and compression of packet data if they have not already been performed.

Processing continues when the packet is separated into subgroups of data bytes which correspond to each of the sublinks (step 404). Step 404 can be implemented using hardware in which data lines are coupled to packet buffer 310 in FIG. 3. These data lines will extract bytes of information from a large packet in parallel to process the data more efficiently.

Next, the data bytes are striped across multiple sublinks in a byte-by-byte manner (step 406). In one embodiment, the sublinks are comprised of a substantially identical physical medium such as common optical fiber or fiber optic bundle and share the same synchronizing clock. Using common clocking and substantially identical equipment can minimize the clock drift between the sublinks.

Each slice of data is synchronously transmitted across each sublink (step 408). at approximately the same moment since the bytes are evenly distributed over each sublink and corresponding slide. The aggregate bandwidth in which data is transmitted depends on the number of sublinks in the system. For example, data transmitted over a set of 4 OC-48 sublinks will be transmitted at an approximate bandwidth at OC-192. At the receiver, a demultiplexer device designed in accordance with the present invention aggregates these multiple sublinks into a single high speed link for use in a high speed network system.

Figure 5:
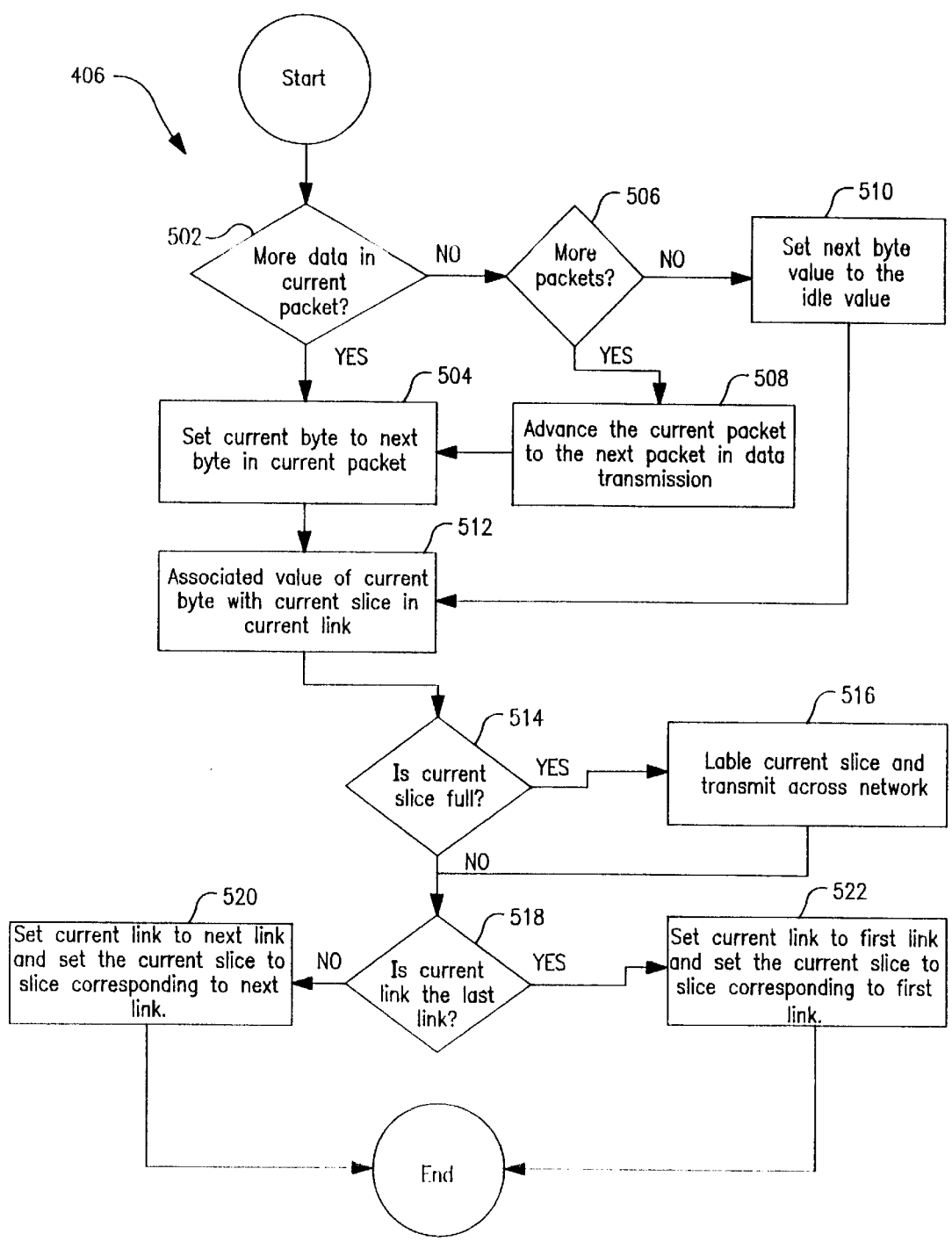
FIG. 5 is a detailed flow chart diagram indicating the steps necessary for striping data from a packet across parallel sublinks.

FIG. 5 is a detailed flow chart indicating the steps necessary for striping data from a packet across parallel sublinks as indicated at step 406 in FIG. 4. The striping process is performed for each byte transmitted within a packet of data. In general, the striping technique must quickly associate each byte with a particular sublink. In one embodiment, the time interval allowed for making this determination is approximately equal to the time it would take to send one byte at the aggregate speed of the sublinks in the network. Alternatively, a separate striping mechanism associated with each of the sublinks and operating in parallel can operate at much slower clock speeds. This alternative striping mechanism need only operate at a time interval corresponding to the bandwidth of the corresponding sublink.

The striping method begins by determining if there is data in the current packet (step 502). If there is data in the current packet, BBB muxing logic 308 in FIG. 3 sets the current byte to the next byte in the current packet (step 504). Alternatively, if no data or no more data exists in the current packet, BBB muxing logic 308 checks if more packets exist in the current data transmission (step 506). If no additional packets exists in the current transmission, BBB muxing logic 308 sets the next byte value to an idle value (step 510). Step 510 is used to fill the current slice on the current link with blank or no values for a uniform transmission characteristic. Alternatively, if BBB muxing logic 308 locates additional packets, BBB muxing logic 308 advances the current packet to the next packet available in the data transmission stream (step 508) and then sets the current byte to the next byte in the current packet (step 504).

Subsequent to step 510 or step 504, BBB muxing logic 308 associates the value of the current byte with a particular slice in a predetermined link (step 512). Slices are a fixed size chunk of data used to carry various packets of information which may be variable size in nature. Each slice is associated with a particular sublink and receives a portion of one or more packets of data. Slices are associated with a header which includes a sequence number or a label that uniquely identifies the slice with a particular packet. Various link sequences can be used to select how each byte gets distributed into the various slices associated with each sublink. These sequences can include a sequential sublink sequence or a pseudo-random sublink. Essentially, the sublink sequence can be any predetermined sublink sequence which ensures that the available sublinks fill with bytes of data at approximately the same rate. Those skilled in the art will utilize a link sequence which is best suited for the desired level of security, ease of implementation, and overall complexity.

Processing continues once a byte has been associated with a particular slice and link combination (step 512). At determination step 514, the method determines if a particular slice associated with a link is full. If the fixed link slice has received a full complement of bytes, the slice is ready to be transmitted. When a slice is full, the method labels the slices transmitted in parallel with a unique label or sequence number (step 516). Labels or sequence numbers are used to determine the sequence in which each group of slices are transmitted. This information enables the receiver to detect when an incomplete set of slices have been transmitted (step 516).

After transmitting multiple slices in parallel over the sublinks, the method determines if the last sublink used by the striping method was the last physical sublink in the set of sublinks (step 518). If the sublink was the last one in the set of sublinks, BBB muxing logic 308 sets the current link to the first link according to a predetermined sublink sequence (step 522). The BBB muxing logic 308 also sets the current slice to the sublink based upon the predetermined sublink sequence.

If BBB muxing logic 308 determines that the last used sublink was not the last sublink in the set of sublinks, BBB muxing logic 308 advances the current sublink to the next sublink based upon a predetermined sublink sequence(step 520). BBB muxing logic 308 also sets the current slice to the slice corresponding to the sublink selected. The striping process is evaluated for each byte of data transmitted within each packet. Accordingly, the steps indicated by flow chart in FIG. 5 are performed iteratively until all bytes in the current data transmission have been transmitted.

Figure 6:
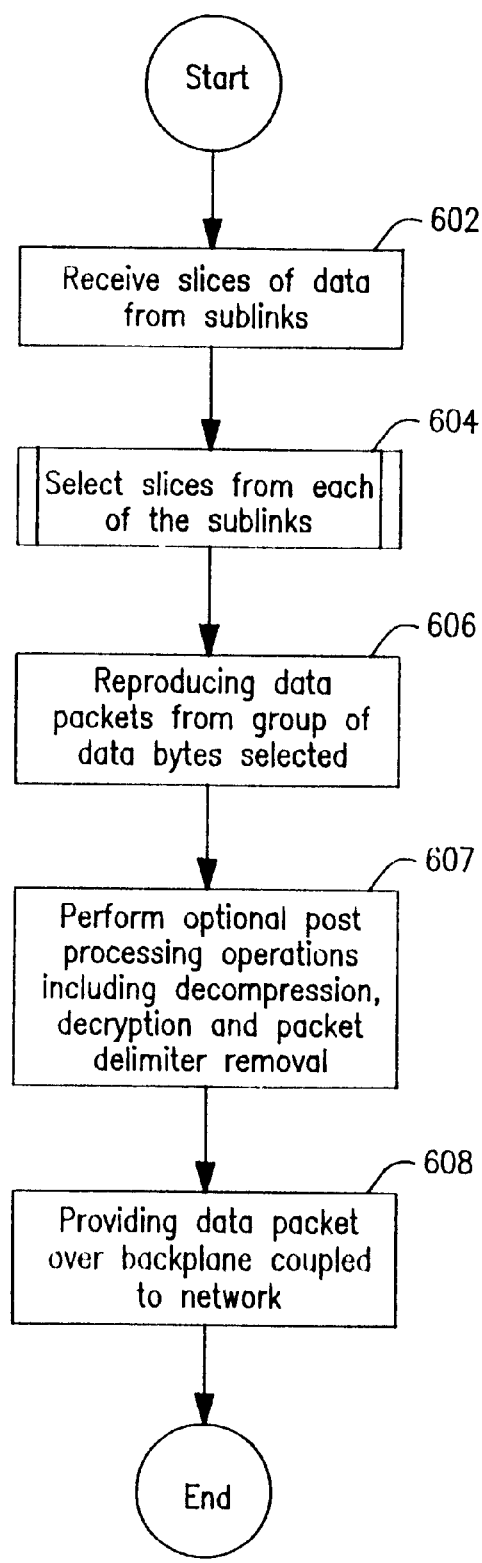
FIG. 6 indicates the overall steps associated with receiving and demultiplexing data transmitted over parallel sublinks.

FIG. 6 indicates the overall steps associated with receiving and demultiplexing data transmitted over parallel sublinks. At step 602, BBB muxing logic 308 receives multiple slices of data from multiple corresponding sublinks. Each slice of data received over each sublink contains data from one or more packets proportional to the bandwidth of each sublink. If all the sublinks have the same bandwidth, they will carry equal amounts of data. Alternatively, sublinks with a higher bandwidth will carry proportionally more data than sublinks having lower bandwidth.

A header associated with each slice of data transmitted in parallel contains unique label or sequence entry. This unique label is used to determine the sequence in which slices are transmitted. A receiver receives the slices from each link and reconstructs the original packet from bytes selected from one or more slices. For example, assume a data packet is transmitted over a SONET communication network consisting of four parallel WDM (wave length division multiplexed) sublinks. The bytes in each packet are distributed evenly over the four parallel WDM sublinks. If the first packet contain at least 4 bytes, then at least 4 slices will be used to transmit the first packet; one byte in each slice over each sublink. Additional slices may be used to transmit the first packet if the packet size has more bytes than the four slices can carry. Essentially, the number of slices used to carry a packet depends on the size of the packet and the capacity of each of slice. The unique label must include a sufficient number of bits to distinguish groups of slices from each other and provide a sequence. In one embodiment, these labels can include an ascending numeric sequence. Generally, an 8 bit label is sufficient for keeping slices of data logically separated from each other.

Next, BBB muxing logic 308 selects one or more slices or groups of slices which make up the packet (step 604). Packets transmitted using multiple groups of slices and are delineated by an inter-packet delimiter within the stream of bytes carried in the slices. Labels stored in the header of each slice provide a relative sequence for the slices and can be used for error detection and correction routines.

At step 606, BBB muxing logic 308 reproduces the data packet originally transmitted from the slices and data bytes received. It is important to note that BBB muxing logic 308 receives the packets in packet order and does not need to reorder the slices of data at the receiver.

At step 607, BBB muxing logic 308 may remove any packet delimiters, inserted into the data stream previously, and optionally decrypts or decompresses the data.

As a final step in the process, BBB muxing logic 308 provides the reproduced data packet over the back plane of a network interconnect device (step 608). Typically, the bandwidth of this backplane approximates the aggregate sum of bandwidth provided by the multiple sublinks.

Figure 7:
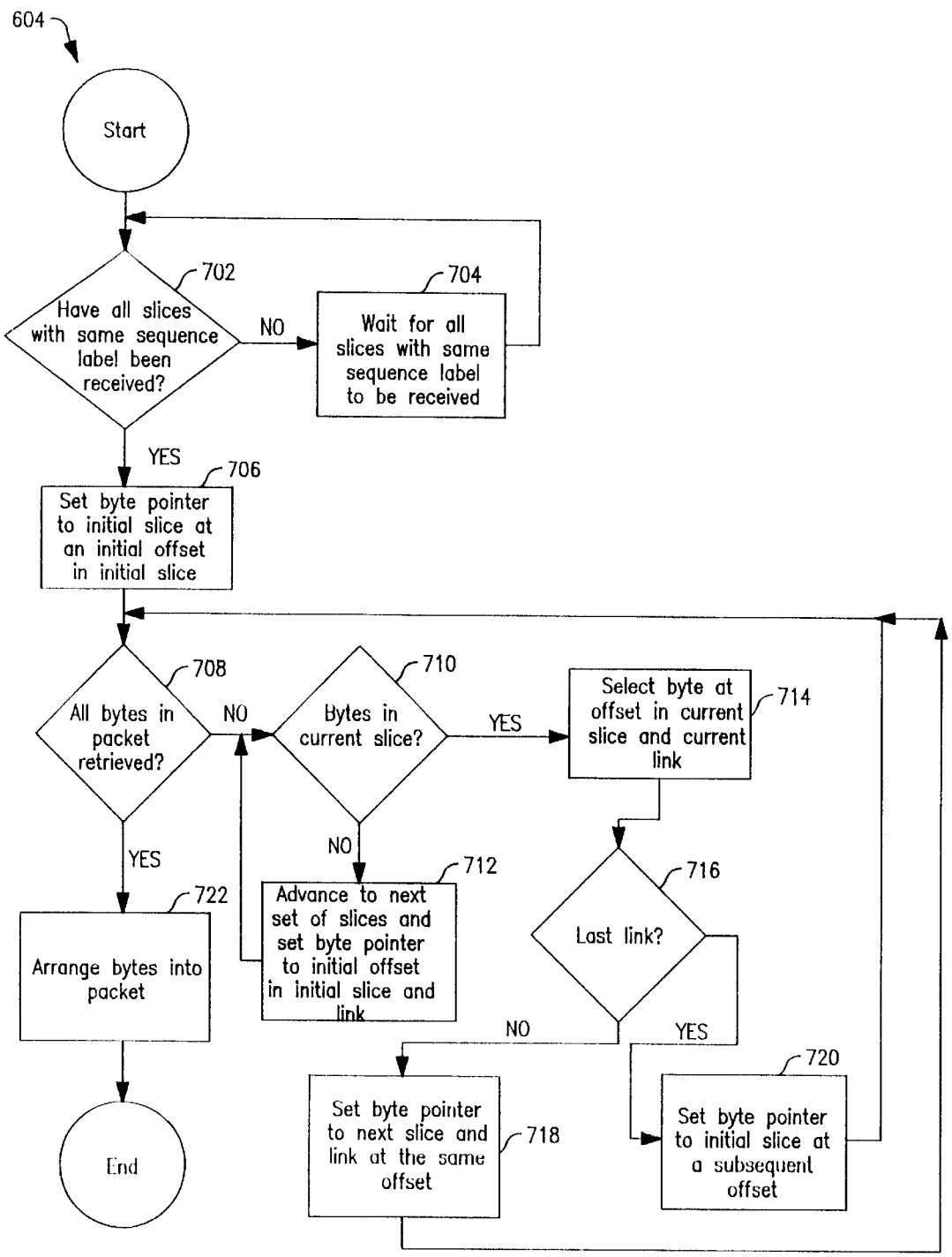
FIG. 7 is a detailed flow chart of the steps associated with selecting bytes from multiple slices provided on a system having parallel sublinks.

FIG. 7 is a detailed flow chart indicating the steps associated with selecting bytes from multiple slices provided on a system having parallel sublinks. The steps indicated in FIG. 7 further detail how slices are selected at step 604 in FIG. 6. Initially, BBB muxing logic 308 checks to see if all the slices associated with a particular packet had been received over the parallel sublinks. Specialized hardware can be used to determine whether all slices have been provided over these links. Specifically, this hardware determines in a parallel manner whether all slices having a particular label have been received. If BBB muxing logic 308 indicates that not all slices have been received (step 702), the process delays while slices having the same sequence label are received over sublinks (step 704).

Once all slices have been received over the sublinks, BBB muxing logic 308 sets a byte pointer to the initial slice and an initial offset. (step 706). For example, the byte pointer can be set to select the first byte in the first slice on link 0. Next, BBB muxing logic 308 checks whether all bytes in a particular packet have been retrieved (step 708). If all of the bytes in a particular packet have been received, the selected bytes are synchronously arranged into the original packet at step 722.

Alternatively, if all bytes in a packet are not retrieved at step 708, then BBB muxing logic 308 determines if there are additional bytes in the current slice (step 710). If there are no bytes in the current slice, the byte pointer is advanced to the next set of slices and set to an initial offset associated with the initial slice and link. Alternatively if a slice has data, the byte pointer is used to select the byte at the current offset in the current slice and link combination (step 714).

After the byte is selected, BBB muxing logic 308 determines if the current link is the last link in the set of parallel links (step 716). If it is the last link, then the byte pointer is set to the initial slice at a subsequent offset (step 720). Alternatively, if it is not the last link, the byte pointer is set to the next slice at the same offset (step 718). If a packet is large it may span several sets of slices. If there are no additional bytes in the current set of slices (step 710), BBB muxing logic 308 advances from step 710 to step 712 where the byte pointer is set to the next set of slices. These steps (steps 708–718) are repeated until all the bytes associated with the packet are retrieved (step 708). Various predetermined link sequences such as sequential and pseudo-random sequences can be used to extract the data from the various sublinks.

ERROR RECOVERY

A system designed in accordance with the present invention also includes an error recovery technique for slices of data which are delayed for a long period of time or lost somewhere between the transmitter and receiver. This error recovery technique could be performed as one or more steps depending from step 704 in FIG. 7 but were omitted from FIG. 7 for simplicity.

When slices are transmitted without errors, groups of slices arrive in packet order as indicated by the predetermined sequence associated with each slice's label. In contrast, error recovery is triggered when slices of data are received out of order. For example, it is an error when a set of slices associated with a higher sequence label (i.e. later in time) are received before all the slices associated with a lower sequence label (i.e. earlier in time) are received. Slices are received out of order only when slices are lost or not transmitted.

Essentially, the error recovery technique detects errors by checking for slices received out of order. Labels associated with each slice provide sequencing information and provide the order in which slices are transmitted and should be received. Accordingly, an incomplete set of slices is discarded if a complete set of slices received later in time have a higher (i.e. later in time) sequence label. While the incomplete slices are being discarded, the complete set of slices is processed by the receiver.

SLICE SIZE DETERMINATION

Selecting the appropriate slice size is a trade-off between performance and buffering resources.

Generally, each slice includes user data, also known as a user payload, and a header containing a packet sequence. The header may also include other metadata useful in transmitting the user payload. To improve throughput, it is desirable to increase the ratio of payload transmitted in comparison to the overhead information carried in the header. Larger slices carrying larger amounts of user payload meet this initial criteria for at least two reasons. First, the header is reduced in size because a smaller packet sequence number can be used to enumerate the packets. Second, the packet sequence number is amortized over more bytes of data.

Exactly how large a sequence number is required is determined by the transmission jitter. The sequence space (range of sequence numbers) should be twice as large as the maximum jitter divided by the slice size. This ensures that the sequence numbers used in the sequence space for transmitting slices are unambiguous. For example, if the jitter can be measured in several microseconds and the slice size is twenty to forty bytes, an eight bit (one byte) sequence space should be adequate.

Scarcity of buffer resources can be used to justify smaller slices within the system. The transmission side needs n slices for buffering. However, the receiving side tends to need more than n slices of buffering to account for the inherent jitter on the receiving end. Fortunately, a fairly large slice size of 1024 bytes on a system having 1000 slices only requires about one megabyte of buffering.

Overall, a BBB striping system designed in accordance with the present invention provides optimal high speed network performance on a set of parallel communication links. Specifically, the BBB striping system provides a more competitive high speed communication system than traditional concatenated SONET. For example, compare a OC-192c link with a BBB striping system utilizing four OC-48c sublinks. An OC-192c frame has 150,327 bytes of user payload, after accounting for SONET headers plus a single 9-byte virtual container header. In contrast, four OC-48c sublinks have a combined 150,300 bytes of user payload since 3 additional 9-byte virtual container headers must also be used. Assuming each slice is 1024 bytes, the overhead ratio for the BBB striping system is only 0.097% which leaves 150,154 bytes of user payload and equates to a maximum rate of 9.61 Gb/s. In contrast, OC-192c has an effective maximum user data rate of 9.62 Gb/s and provides only a difference of 0.1%.

While specific embodiments have been described herein for purposes of illustration, various modifications may be made without departing from the spirit and scope of the invention. Those skilled in the art understand that the present invention can be implemented in a wide variety of hardware and software platforms and is not limited to the traditional routers, switches, and intelligent hub devices discussed above. Alternative embodiments substantially similar to the preferred embodiment could be implemented except that the number of bytes and the slice size associated with each sublink is proportional to the fraction of bandwidth contributed by each sublink to the overall aggregate bandwidth. This configuration is useful when the bandwidth for the sublinks are unequal. If one sublink has twice the bandwidth of another sublink, twice as many bytes are provided to the sublink for transmission. Further, the sublink having twice the bandwidth will also have a slice size which is twice the size of the correspondingly slower sublink. Accordingly, the invention is not limited to the above described embodiments, but instead is defined by the appended claims in light of their full scope of equivalents.

What is claimed is:

1. A method for transmitting data executed on a processor unit which is operatively coupled to a plurality of communication sublinks and capable of distributing bandwidth from a single communication link over the communication sublinks, the method comprising the steps of:

receiving a packet of data bytes from a communication link operatively coupled to the communication sublinks and having a bandwidth greater than the individual bandwidth available on any one of the communication sublinks;

distributing the packet of data by bytes received into slices identifiable as a group; and transmitting the slices of data bytes in parallel over the communication sublinks, respectively.

2. The method of claim 1, wherein the distributing step further comprises the steps of:

determining when a predetermined number of data bytes in the packet have been distributed across the sublinks; and collecting the data bytes associated with each of the sublinks into a respective one of the slices.

3. The method of claim 2, wherein the collecting step further comprises the step of labeling each slice in a group of slices with a predetermined unique label.

4. The method of claim 1, wherein the transmitting step is performed synchronously for each of the sublinks and the aggregate bandwidth is at least greater than the bandwidth available on any one of the sublinks.

5. The method of claim 1, wherein the processor unit is a application specific integrated circuit (ASIC).

6. The method of claim 1, wherein the processor unit is a programmable logic device (PLD).

7. The method of claim 1, wherein the distributing step further comprises the substep of separating the packet of data bytes into subgroups of bytes corresponding to the number of sublinks.

8. A method for transmitting data executed on a processor unit which is operatively coupled to a plurality of communication sublinks and capable of distributing bandwidth from a single communication link over the communication sublinks, the method comprising the steps of:

receiving a packet of data bytes from a communication link operatively coupled to the communication sublinks and having a bandwidth greater than the individual bandwidth available on any one of the communication sublinks;

distributing the packet of data by bytes received over each of the sublinks by separating the packet of data bytes into subgroups of bytes corresponding to the number of sublinks, wherein the separating step comprises the steps of:

associating at least the first byte in the packet of data bytes received with one of the sublinks as determined by a predetermined sublink sequence;

associating at least one or more subsequent bytes from the packet of data bytes received with one or more of the sublinks based upon the predetermined sublink sequence;

determining if the selected sublink sequence has associated at least one byte with each of the sublinks; and repeating the steps above to further associate subsequent bytes from the packet with the sublinks; and transmitting the data bytes in parallel over the communication sublinks.

9. The method of claim 8 wherein the predetermined sublink sequence is a sublink sequence which ensures that the slices associated with each sublink are filled with bytes of data at substantially the same rate.

10. The method of claim 8 wherein the predetermined sublink sequence is a consecutive sublink sequence.

11. The method of claim 8 wherein the predetermined sublink sequence is a pseudo-random sublink sequence.

12. The method of claim 8 wherein the number of bytes associated with each sublink is proportional to the fraction of bandwidth contributed by each sublink to an overall aggregate bandwidth.

13. The method of claim 8 wherein the size of the slice associated with each sublink is proportional to the fraction of bandwidth contributed by each sublink to an overall aggregate bandwidth.

14. The method of claim 1 wherein the byte includes one or more bits of data.

15. The method of claim 1 wherein the processor unit is coupled to a network interconnect device.

16. The method of claim 15 wherein the network interconnect device is a switch.

17. The method of claim 15 wherein the network interconnect device is a router.

18. The method of claim 15 wherein the network interconnect device is an intelligent hub.

19. The method of claim 1 wherein the processor unit is coupled to a computer system.

20. A method for receiving data executed on a processor unit which is operatively coupled a plurality of communication sublinks and capable of aggregating the bandwidth of the sublinks into a single communication link, the method comprising the steps of:

receiving over the sublinks slices of data identifiable as a group; and recreating a packet by extracting bytes from one or more of the slices received over the sublinks.

21. A method for receiving data executed on a processor unit which is operatively coupled to a plurality of communication sublinks and capable of aggregating the bandwidth of the sublinks into a single communication link, the method comprising the steps of:

receiving one or more slices of data over the sublinks;

recreating a packet by extracting bytes from the slices received over the set of sublinks;

including a predetermined unique label with each group of one or more slices of data;

determining if the slices having the predetermined unique label have been received over the sublinks; and if all slices associated with the predetermined unique label have not been received over the set of sublinks, delaying processing until all slices associated with the predetermined unique label are received by the set of sublinks.

22. The method of claim 21 further comprising the step of providing the packet of data bytes over the single communication link at a bandwidth which is at least greater than the bandwidth of any one of the sublinks.

23. A method for receiving data executed on a processor unit which is operatively coupled to a plurality of communication sublinks and capable of aggregating the bandwidth of the sublinks into a single communication link, the method comprising the steps of:

receiving one or more slices of data over the sublinks; and recreating a packet by extracting bytes from the slices received over the set of sublinks, wherein the recreating step further comprises the steps of:

selecting a first byte from the first slice of data transmitted over a first sublink associated with the sublinks according to a predetermined sublink sequence;

selecting at least one or more subsequent bytes from slices of data transmitted over a subsequent sublink associated with the sublinks based upon the selected predetermined sublink sequence; and if at least one byte has been selected from each of the sublinks, then repeating the steps above to select subsequent bytes from the slices associated with each sublink.

24. The method of claim 23 further comprising the steps of:

determining when all of the data bytes associated with the packet have been selected from the slices received over the set of sublinks; and generating a packet of data bytes from the selected data bytes received from the slices on the sublinks.

25. The method of claim 23 wherein the predetermined sublink sequence is a sublink sequence which ensures that the slices associated with each sublink are filled with bytes of data at substantially the same rate.

26. The method of claim 23 wherein the predetermined sublink sequence is a consecutive sublink sequence.

27. The method of claim 23 wherein the predetermined sublink sequence is a pseudo-random sublink sequence.

28. A method for receiving data executed on a processor unit which is operatively coupled to a plurality of communication sublinks and capable of aggregating the bandwidth of the sublinks into a single communication link, the method comprising the steps of:

receiving one or more slices of data over the sublinks; and recreating a packet by extracting bytes from the slices received over the set of sublinks, wherein the recreating step uses a byte-by-byte striping technique and further includes error recovery steps comprising:

checking if one or more slices received are associated with different predetermined labels;

determining if the slices received includes a first set of slices having a first predetermined label associated with packets transmitted earlier in time and a second set of slices having a second predetermined label associated with packets transmitted later in time; and if at least one slice having the first predetermined label is missing, discarding all slices associated with the first label.

29. The method of claim 23 wherein the number of bytes associated with each sublink is proportional to the fraction of bandwidth contributed by each sublink to an overall aggregate bandwidth.

30. The method of claim 23 wherein the size of the slice associated with each sublink is proportional to the fraction of bandwidth contributed by each sublink to an overall aggregate bandwidth.

31. The method of claim 20 wherein the byte includes one or more bits of data.

32. The method of claim 20 wherein the processor unit is coupled to a network interconnect device.

33. The method of claim 32 wherein the network interconnect device is a switch.

34. The method of claim 32 wherein the network interconnect device is a router.

35. The method of claim 32 wherein the network interconnect device is an intelligent hub.

36. The method of claim 20 wherein the processor unit is coupled to a computer system.

37. An apparatus for transmitting data executed on a processor unit which is operatively coupled to a plurality of communication sublinks and capable of distributing bandwidth from a single communication link over the communication sublinks, the apparatus comprising:

a receiver configured to receive a packet of data bytes from a communication link operatively coupled to the communication sublinks and having a bandwidth greater than the individual bandwidth available on any one of the communication sublinks;

a means for distributing the packet of data by bytes received into slices identifiable as a group; and a transmitter configured to transmit the slices of data bytes in parallel over the communication sublinks, respectively.

38. The apparatus of claim 37, wherein the distributing means further comprises:

a means for determining when a predetermined number of data bytes in the packet have been distributed across the sublinks; and a means for collecting the data bytes associated with each of the sublinks into a respective one of the slices.

39. The apparatus of claim 38, wherein the means for collecting data bytes further comprises a means for labeling each slice in a group of slices with a predetermined unique label.

40. The apparatus of claim 37, wherein the transmitter is synchronized with each of the sublinks and the aggregate bandwidth is at least greater than the bandwidth available on any one of the sublinks.

41. The apparatus of claim 37, wherein the processor unit is an application specific integrated circuit (ASIC).

42. The apparatus of claim 37, wherein the processor unit is a programmable logic device (PLD).

43. The apparatus of claim 37, wherein the means for distributing further comprises a means for separating the packet of data bytes into subgroups of bytes corresponding to the number of sublinks.

44. An apparatus for transmitting data executed on a processor unit which is operatively coupled to a plurality of communication sublinks and capable of distributing bandwidth from a single communication link over the communication sublinks, the apparatus comprising:

a receiver configured to receive a packet of data bytes from a communication link operatively coupled to the communication sublinks and having a bandwidth greater than the individual bandwidth available on any one of the communication sublinks;

a means for distributing the packet of data by bytes received over each of the sublinks; and a transmitter configured to transmit the data bytes in parallel over the communication sublinks;

wherein the means for distributing comprises a means for separating the packet of data bytes into subgroups of bytes corresponding to the number of sublinks, said separating means comprises:

a means for associating at least the first byte in the packet of data bytes received with one of the sublinks as determined by a predetermined sublink sequence;

a means for associating at least one or more subsequent bytes from the packet of data bytes received with one or more of the sublinks based upon the predetermined sublink sequence; and a means for determining if the selected sublink sequence has associated at least one byte with each of the sublinks.

45. The apparatus of claim 44 wherein the predetermined sublink sequence is a sublink sequence which ensures that the slices associated with each sublink are filled with bytes of data at substantially the same rate.

46. The apparatus of claim 44 wherein the predetermined sublink sequence is a consecutive sublink sequence.

47. The apparatus of claim 44 wherein the predetermined sublink sequence is a pseudo-random sublink sequence.

48. The apparatus of claim 44 wherein the number of bytes associated with each sublink is proportional to the fraction of bandwidth contributed by each sublink to an overall aggregate bandwidth.

49. The apparatus of claim 44 wherein the size of the slice associated with each sublink is proportional to the fraction of bandwidth contributed by each sublink to an overall aggregate bandwidth.

50. The apparatus of claim 37 wherein the byte includes one or more bits of data.

51. The apparatus of claim 37 wherein the processor unit is coupled to a network interconnect device.

52. The apparatus of claim 51 wherein the network interconnect device is a switch.

53. The apparatus of claim 51 wherein the network interconnect device is a router.

54. The apparatus of claim 51 wherein the network interconnect device is an intelligent hub.

55. The apparatus of claim 37 wherein the processor unit is coupled to a computer system.

56. An apparatus for receiving data executed on a processor unit which is operatively coupled a plurality of communication sublinks and capable of aggregating the bandwidth of the sublinks into a single communication link, the apparatus comprising:

a receiver configured to receive over the sublinks slices of data identifiable as a group; and a means for recreating a packet by extracting bytes from one or more of the slices received over the sublinks.

57. An apparatus for receiving data executed on a processor unit which is operatively coupled to a plurality of communication sublinks and capable of aggregating the bandwidth of the sublinks into a single communication link, the apparatus comprising:

a receiver configured to receive one or more slices of data over the sublinks;

a means for recreating a packet by extracting bytes from the slices received over the set of sublinks;

a means for including a predetermined unique label with each group of one or more slices of data;

a means for determining if the slices having the predetermined unique label have been received over the sublinks; and if all slices associated with the predetermined unique label have not been received over the set of sublinks, a means for delaying processing until all slices associated with the predetermined unique label are received by the set of sublinks.

58. The apparatus of claim 57 further comprising a means for providing the packet of data bytes over the single communication link at a bandwidth which is a least greater than the bandwidth of any one of the sublinks.

59. An apparatus for receiving data executed on a processor unit which is operatively coupled to a plurality of communication sublinks and capable of aggregating the bandwidth of the sublinks into a single communication link, the apparatus comprising:

a receiver configured to receive one or more slices of data over the sublinks; and a means for recreating a packet by extracting bytes from the slices received over the set of sublinks, wherein the recreating means further comprises:

a means for selecting a first byte from the first slice of data transmitted over a first sublink associated with the sublinks according to a predetermined sublink sequence; and a means for selecting at least one or more subsequent bytes from slices of data transmitted over a subsequent sublink associated with the sublinks based upon the selected predetermined sublink sequence.

60. The apparatus of claim 59 further comprising:

a means for determining when all of the data bytes associated with the packet have been selected from the slices received over the set of sublinks; and a means for generating a packet of data bytes from the selected data bytes received from the slices on the sublinks.

61. The apparatus of claim 59 wherein the predetermined sublink sequence is a sublink sequence which ensures that the slices associated with each sublink are filled with bytes of data at substantially the same rate.

62. The apparatus of claim 59 wherein the predetermined sublink sequence is a consecutive sublink sequence.

63. The apparatus of claim 59 wherein the predetermined sublink sequence is a pseudo-random sublink sequence.

64. An apparatus for receiving data executed on a processor unit which is operatively coupled to a plurality of communication sublinks and capable of aggregating the bandwidth of the sublinks into a single communication link, the apparatus comprising:

a receiver configured to receive one or more slices of data over the sublinks; and a means for recreating a packet by extracting bytes from the slices received over the set of sublinks, wherein the means for recreating the packet uses a byte-by-byte striping technique and further includes a means for performing error recovery comprising:

a means for checking if one or more slices received are associated with different predetermined labels;

a means for determining if the slices received includes a first set of slices having a first predetermined label associated with packets transmitted earlier in time and a second set of slices having a second predetermined label associated with packets transmitted later in time; and if at least one slice having the first predetermined label is missing, a means for discarding all slices associated with the first label.

65. The apparatus of claim 59 wherein the number of bytes associated with each sublink is proportional to the fraction of bandwidth contributed by each sublink to an overall aggregate bandwidth.

66. The apparatus of claim 59 wherein the size of the slice associated with each sublink is proportional to the fraction of bandwidth contributed by each sublink to an overall aggregate bandwidth.

67. The apparatus of claim 56 wherein the byte includes one or more bits of data.

68. The apparatus of claim 56 wherein the processor unit is coupled to a network interconnect device.

69. The apparatus of claim 68 wherein the network interconnect device is a switch.

70. The apparatus of claim 68 wherein the network interconnect device is a router.

71. The apparatus of claim 68 wherein the network interconnect device is an intelligent hub.

72. The apparatus of claim 56 wherein the processor unit is coupled to a computer system.

73. A method for transmitting data executed on a processor unit which is operatively coupled to a plurality of communication sublinks and capable of distributing bandwidth from a single communication link over the communication sublinks, the method comprising the steps of:

receiving a packet of data bytes from a communication link, operatively coupled to the communication sublinks and having a bandwidth greater than the individual bandwidth available on any one of the communication sublinks;

distributing the packet of data by bytes received into slices;

labeling the slices such that the labeled slices are identifiable as a group and that transmission sequence of each labeled slice over each of the communication sublinks is determinable; and transmitting the labeled slices of data bytes in parallel over the communication sublinks, respectively.

74. A method for receiving data executed on a processor unit which is operatively coupled to a plurality of communication sublinks and capable of aggregating the bandwidth of the sublinks into a single communication link, the method comprising the steps of receiving over the communication sublinks slices of data labeled such that the slices are identifiable as a group and that transmission sequence of each slice received over each of the communication sublinks is determinable; and recreating a packet by extracting bytes from one or more of the slices received over the communication sublinks.

75. An apparatus for transmitting data executed on a processor unit which is operatively coupled to a plurality of communication sublinks and capable of distributing bandwidth from a single communication link over the communication sublinks, the apparatus comprising:

a receiver configured to receive a packet of data bytes from a communication link operatively coupled to the communication sublinks and having a bandwidth greater than the individual bandwidth available on any one of the communication sublinks;

a means for distributing the packet of data by bytes received into slices;

a means for labeling the slices such that the labeled slices are identifiable as a group and that transmission sequence of each labeled slice over each of the communication sublinks is determinable; and a transmitter configured to transmit the labeled slices of data bytes in parallel over the communication sublinks, respectively.

76. An apparatus for receiving data executed on a processor unit which is operatively coupled to a plurality of communication sublinks and capable of aggregating the bandwidth of the sublinks into a single communication link, the apparatus comprising:

a receiver configured to receive over the sublinks slices of data labeled such that the slices are identifiable as a group and that transmission sequence of each slice over each of the communication sublinks is determinable; and a means for recreating a packet by extracting bytes from one or more of the slices received over the sublinks.

* * * * *